United States Patent Office 3,218,300
Patented Nov. 16, 1965

3,218,300
POLYTHIOACETALS OF HIGH MOLECULAR WEIGHT AND PROCESS FOR PREPARING THEM
Klaus Küllmar, Edgar Fischer, and Klaus Weissermel, all of Frankfurt am Main, Germany, assignors to Farbwerke Hoechst Aktiengesellschaft vormals Meister Lucius & Bruning, Frankfurt am Main, Germany, a corporation of Germany
No Drawing. Filed June 27, 1961, Ser. No. 119,812
Claims priority, application Germany, June 30, 1960, F 31,546
9 Claims. (Cl. 260—79)

The present invention relates to polythioacetals of high molecular weight and to a process for preparing them.

It is known to produce polymeric thioformaldehyde by introducing hydrogen sulfide into a boiling alcoholic solution of hexamethylene-tetramine which is saturated with ammonia (cf. A. Wohl, B. 19, 2344 (1886); E. Baumann and E. Fromm, B. 24 1468 (1891). The product is obtained in the form of a white powder having a peculiar odor. It is insoluble in all organic solvents and melts at 175–176° C. to form a turbid melt which becomes limpid at higher temperatures only. The literature does not give further particulars about the other properties of the said polymer.

It has now been found that cyclic thioacetals, and particularly trithiane, the cyclic trimer of thioformaldehyde the monomeric form of which is unstable, can be polymerized in the melt in the presence of cationically active catalysts and in the absence of solvents to polythioacetals of high molecular weight which can be worked up in the thermoplastic state.

As cationically active catalysts there are especially suitable compounds which can take up one or several electron pairs in an incomplete valence shell of one of their atoms. Suitable catalysts are thus compounds which can be considered as electron acceptors or Lewis acids (cf. Kortüm, Lehrbuch der Elektrochemie, Wiesbaden 1948, Pages 300 and 301).

From among the great number of inorganic compounds which are known as Lewis acids and are active as polymerization catalysts there are mentioned by way of example: $BCl_3$, $AlCl_3$, $FeCl_3$, $SbCl_3$, $SbCl_5$, $ZnCl_2$, $SnCl_4$, $TiCl_4$ and preferably $BF_3$.

The dosage of the catalyst sometimes requires special precautions, since, almost without exception, the enumerated cationically active polymerization catalysts initiate the polymerization instantaneously under the chosen polymerization conditions. It is therefore often advantageous to dilute the catalysts, especially the readily volatile metal or nonmetal halide catalysts, with an inert medium, particularly with gases such as noble gases, nitrogen, trifluoromethane, in order to attain a uniform distribution of the catalyst in the polymerization medium.

In the further development of the process of the invention for the manufacture of polythioacetals it has been found that also complex compounds of Lewis acids are especially suitable catalysts in the polymerization of the invention.

There are mentioned by way of example the known addition compounds of Lewis acids with organic ethers, thioethers, esters, amines, carboxylic acid amides, carboxylic anhydrides. Complex of molecule compounds of this kind are, for example, the additional compound of boron-trifluoride with dimethyl ether, the addition compound of boron-trifluoride with methylethyl ether, the addition compound of boron-trifluoride with diethyl ether, the addition compound of boron-trifluoride with diisoamyl ether, the addition compound of boron-trifluoride with tetrahydrofurane, the addition compound of boron-trifluoride with tetrahydropyrane, the addition compound of boron-trifluoride with diethyl thioether; the molecular compounds of boron-trifluoride with aliphatic carboxylic acid esters such as formic acid methyl ester and acetic acid methyl ester; the complex compounds of boron-trifluoride with carboxylic anhydrides, such as chloroacetic anhydride or phenylacetic anhydride, the nitrogenous complex compounds of boron-trifluoride with diphenylamine, acetonitrile, and also with mono-or dicarboxylic acid amides.

These complex compounds can be easily prepared by known methods and represent well defined liquids or compounds capable of crystallizing.

The reactivity of the complex compounds varies very much and depends to a great extent on the acidity of the electron acceptor, i.e. the Lewis acid, and on the basicity of the electron donor, i.e. the basicity of the Lewis base.

By an appropriate combination of the acid-base-couple, compounds having various degrees of activity may be obtained. Thus, for example, the amine-$BF_3$-complex compounds are less effective for the polymerization of trithiane than the $BF_3$-tetrahydrofurane or $BF_3$-tetrahydropyrane addition compounds.

The complex compounds of Lewis acids may be used as such or as a mixture for the polymerization of trithiane. It has furthermore been found that the Lewis acids in the form of their saline complex compounds, advantageously the oxonium salts and diazonium salts of, for example, $BF_3$, $SbCl_5$, $FeCl_3$, $SnCl_4$, and $PF_5$ are also useful catalysts for the mass polymerization of trithiane according to the process of the present invention.

The aryl-diazonium salts, which are easily accessible by classic synthetic methods and can be modified to a large extent, have been found to be highly active and of great industrial importance. The special advantage of this class of catalysts is that they are readily soluble in the monomer to be polymerized and that their catalytic activity only emerges after the disintegration of the aryl-diazonium salt, preferably after the disintegration of the aryl-diazonium-fluoroborate.

The disintegrability of the aryl-diazonium salts is different for each individual salt and is also influenced by the different synthesis of the salts. It has also been found that there exist aryl-diazonium salts, and advantageously aryl-diazonium fluoroborates, which thermally disintegrate under the polymerization conditions of the present process; others, however, only disintegrate under the same polymerization conditions in the presence of light, for example in the presence of normal sunlight or the light of a mercury lamp, and then initiate the polymerization. The required or preferred source of light depends mainly on the spectral sensibility of the aryl-diazonium fluoroborate applied.

Thus certain thermo-active and light-active aryl-diazonium salts are particularly advantageous for the polymerization of thioacetals.

There may be mentioned the following saline complex compounds of Lewis acids:

(a) OXONIUM SALTS trimethyl-, triethyl- tri-n-propyl-oxonium-fluoroborate, methyl-tetramethylene-oxonium-fluoroborate, ethyl-tetramethylene-oxonium-fluoroborate, methyl- or ethyl-pentamethylene-oxonium-fluoroborate, the oxonium salts of dimethylpyrone, cumarine and camphor, furthermore the oxonium salts of analogous construction or inner oxonium salts of iron, antimony, or tin, such as trialkyl-oxonium-tetrachloro-ferriate, trialkyl-oxonium-hexachloro-antimonate, and bis-trialkyl-oxonium-hexachloro-stannate.

(b) DIAZONIUM SALTS (α) Light-active diazonium salts

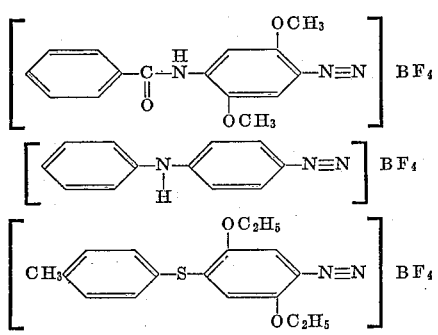

(β) Thermo-active diazonium salts which can simultaneously be activated by light

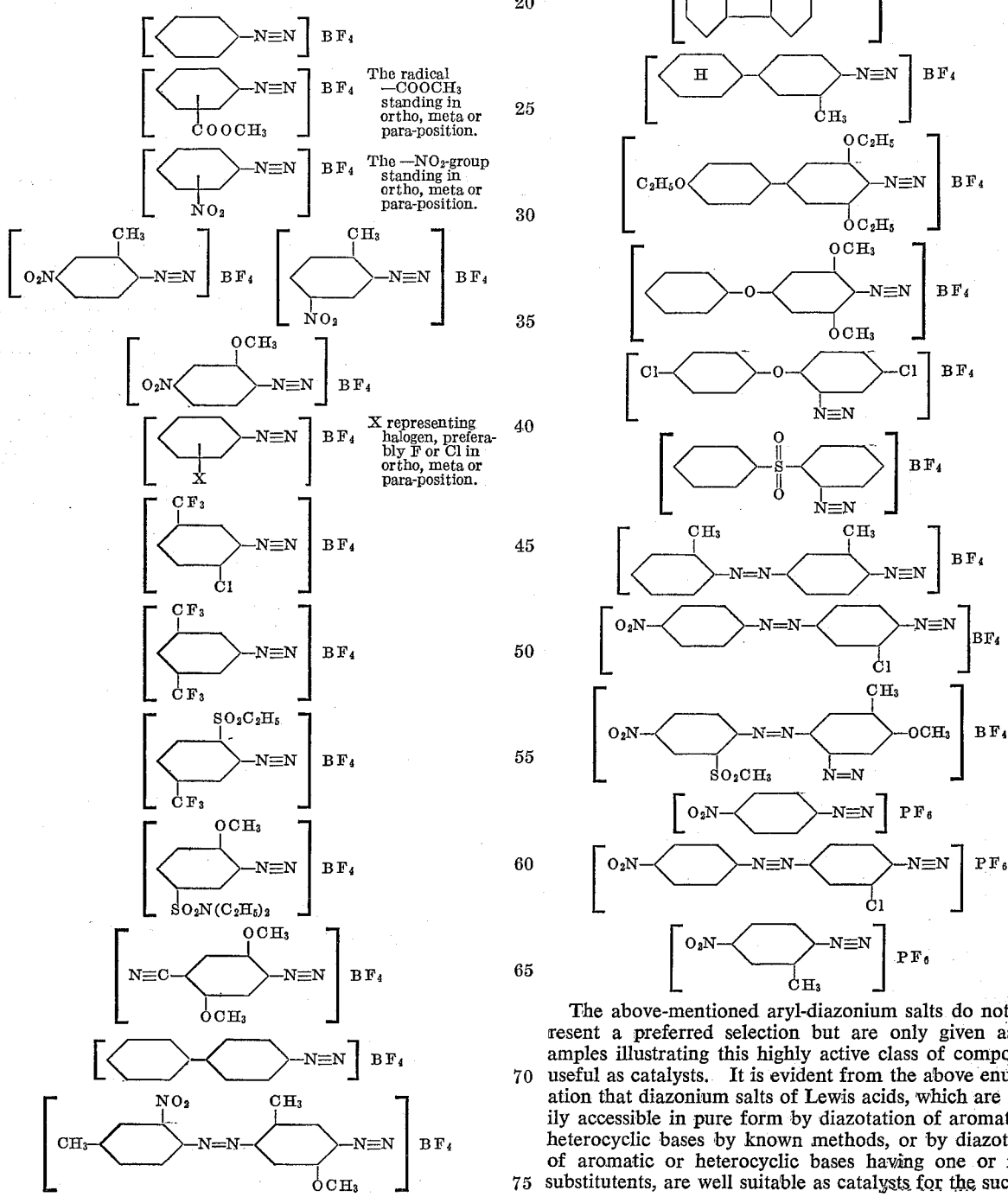

The above-mentioned aryl-diazonium salts do not represent a preferred selection but are only given as examples illustrating this highly active class of compounds useful as catalysts. It is evident from the above enumeration that diazonium salts of Lewis acids, which are readily accessible in pure form by diazotation of aromatic or heterocyclic bases by known methods, or by diazotation of aromatic or heterocyclic bases having one or more substitutents, are well suitable as catalysts for the successful polymerization of cyclic thioacetals, and preferably as catalysts for the polymerization of trithiane, by the process of the present invention. The solubility and disintegrability of the aryl-diazonium salts under the chosen polymerization conditions are largely determined by the structure, nature and number of substituents.

The activity of the diazonium salts may be impaired by substituents of the aromatic system which act as electron donors, for example amino groups.

The catalyst is preferably used in an amount ranging from 0.0001 to 1.0 mol percent and preferably from 0.001 to 0.1 mol percent, calculated on the monomer. The catalyst concentration depends on the activity of the catalyst, the purity of the monomer and the polymerization conditions applied. Since the rate of polymerization increases with the increase of the concentration of the catalyst, the latter shall be chosen in a manner such that the polymerization heat set free can be easily dissipated.

The cyclic thioacetal, preferably the trithiane, used in the process of the present invention can be readily prepared by known methods, for example by reacting formaldehyde-liberating substances with sodium thiosulfate in the presence of hydrochloric acid. The thioacetal must be substantially free from impurities, especially sulfur-containing impurities, since traces of impurities inhibit already the cationic polymerization or impair its reproducibility.

The monomer can be purified by repeated systematic recrystallization, for example from benzene.

The polymerization of cyclic thioacetals, and preferably of trithiane, is carried out at a temperature above the melting point of said thioacetals, for example in the case of trithiane at about 220 to 250° C. It is of advantage to exclude atmospheric oxygen during the polymerization, for example by superposition of nitrogen, since otherwise the monomeric sulfur compounds may readily oxidize. After the addition of the catalyst to the melt of the monomer while stirring, the polymerization sets in within a few seconds and it is complete in the course of several minutes. In the course of the polymerization the initially thinly liquid melt becomes gradually viscous and at the end it is so viscous that stirring must be interrupted. On cooling the limpid viscous mass solidifies to a very hard, white polymer block.

For working up the block is comminuted and finely ground. The polymer powder thus obtained is boiled under reflux in a high boiling solvent, for example chlorobenzene, o- or m-dichlorobenzene, anisol, or ethylbenzene. Part of the solvent is then distilled off, whereby the sulfur-containing impurities that have been formed in the polymerization and possess an unpleasant odor are split and the decomposition products are expelled. The polymer is then filtered off with suction and repeatedly washed with hot solvent. After drying a white polymer powder is obtained which is practically free from odor and insoluble in the usual organic solvents. At a temperature above 200° C. the powder dissolves in quinoline from which it precipitates again on cooling.

The polytrithiane prepared by the process of the present invention melts without decomposition at 247–250° C. to form a transparent, colorless and viscous melt. By the usual working methods for thermoplasts it can be worked at a temperature of about 260° C. into tough films and foils and various shaped structures which are distinguished by a high thermal stability and which possess a high stability to oxidation.

The following examples serve to illustrate the invention but they are not intended to limit it thereto, the parts being by weight unless otherwise stated.

Example 1

50 parts of pure trithiane were melted in a nitrogen atmosphere. At 200° C. and while stirring 0.002 part of gaseous boron trifluoride was introduced. The polymerization set in after a few seconds and a tough, highly viscous mass was formed which could no longer be stirred and which solidified on cooling to a white and hard polymer block.

For working up the block was comminuted and finely ground. The polymer powder obtained was boiled for 1 hour under reflux with 500 parts of chlorobenzene, about 300 parts of the solvent were distilled off, the polymer was filtered off while hot and washed twice with hot chlorobenzene. After having been dried for 24 hours at 100° C. under reduced pressure a white, practically odorless polymer powder was obtained which lost 0.48% of its weight when heated for 30 minutes at 202° C.

Example 2

100 parts of pure trithiane were melted in a nitrogen atmosphere and to the melt there was added at 230° C. while stirring, 0.006 part of the addition compound of boron trifluoride and tetrahydrofurane. The polymerization which soon set in yielded a highly viscous, colorless mass which solidified on cooling to a hard, white polymer block.

The block was comminuted and finely ground. The powder obtained was boiled for 30 minutes under reflux with 600 parts of o-dichlorobenzene, 200 parts of the solvent were distilled off, the polymer was filtered off while hot, washed twice with hot o-dichlorobenzene and then twice with methanol. After having dried for 20 hours at 90° C. under reduced pressure there were obtained 65 grams of a white, practically odorless polymer powder. When heated for 30 minutes at 202° C. the powder lost 0.39% of its weight. At a temperature of 260° C. and under a pressure of 100 kg./cm.$^2$ the polymer could be pressed into tough and elastic films and foils.

Example 3

100 parts of pure trithiane were melted in a nitrogen atmosphere and to the melt there was added at 235° C., while stirring, 0.007 part of tin tetrachloride. The polymerization set in rapidly and yielded a highly viscous mass which solidified on cooling to a hard, white polymer block.

The block was comminuted and finely ground. The powder obtained was boiled for 1 hour under reflux with 700 parts of cumene, 500 parts of the solvent were distilled off, the polymer was filtered while hot, washed twice with hot cumene and then twice with methanol. After having dried for 20 hours at 90° C. under reduced pressure 73 grams of a white, practically odorless polymer powder were obtained which lost 0.54% of its weight when heated for 30 minutes at 202° C.

Example 4

80 parts of pure trithiane were melted in a nitrogen atmosphere and to the melt there was added at 230° C., while stirring, 0.008 part of triethyl-oxonium-fluoroborate. The polymerization set in after a short while and a highly viscous mass was formed which solidified on cooling to a solid polymer block.

The block was comminuted and finely ground. The powder obtained was boiled for 1 hour under reflux with 1000 parts of chlorobenzene, 800 parts of the solvent were distilled off, the polymer was filtered off while hot and washed twice with hot chlorobenzene. After having dried for 24 hours at 100° C. under reduced pressure a white polymer was obtained which lost 0.42% of its weight when heated for 30 minutes at 202° C.

Example 5

150 parts of pure trithiane were melted in a nitrogen atmosphere and to the melt there was added 0.012 part of p-nitrophenyldiazonium-fluoroborate. The polymerization set in after a few minutes and a highly viscous mass was formed which solidified on cooling to a solid polymer block.

The block was comminuted and finely ground. The powder obtained was boiled for 45 minutes under reflux with 900 parts of anisol, 450 parts of the solvent were distilled off, the polymer was filtered off while hot, washed twice with hot anisol and twice with methanol. After having dried for 20 hours at 90° C. under reduced pressure 120 grams of a white, practically odorless polymer were obtained which lost 0.37% of its weight when being heated for 30 minutes at 202° C. At a temperature of 255° C. and under a pressure of 80 kg./cm.$^2$ the polymer could be pressed into tough and elastic films and foils.

We claim:

1. A process for the manufacture of polythioacetals of high molecular weight, which comprises the step of polymerizing symmetrical trithiane by the mass polymerization process in admixture with at least one Lewis acid catalyst at a temperature within the range of about 220° C. to about 250° C.

2. A process for the manufacture of polythioacetals of high molecular weight, which comprises the step of polymerizing symmetrical trithiane by the mass polymerization process in admixture with 0.0001 to 1 mol percent, calculated upon the trithiane, of at least one Lewis acid at a temperature within the range of 220° to 250° C.

3. A process for the manufacture of polythioacetals of high molecular weight, which comprises the step of polymerizing symmetrical trithiane by the mass polymerization process in admixture with 0.0001 to 1 mol percent, calculated upon the trithiane, of at least one member selected from the group consisting of $BCl_3$, $FeCl_3$, $SbCl_3$, $SbCl_5$, $ZnCl_2$, $SnCl_4$, $TiCl_4$ and $BF_3$ at a temperature within the range of 200° C. to 250° C.

4. A process for the manufacture of polythioacetals of high molecular weight, which comprises the step of polymerizing symmetrical trithiane by the mass polymerization process in admixture with 0.0001 to 1 mol percent, calculated upon the trithiane, of boron-trifluoride at a temperature within the range of 220° C. to 250° C.

5. A process for the manufacture of polythioacetals of high molecular weight, which comprises the step of polymerizing symmetrical trithiane by the mass polymerization process in admixture with 0.0001 to 1 mol percent, calculated upon the trithiane, of at least one complex compound of a Lewis acid at a temperature within the range of 220° C. to 250° C.

6. A process for the manufacture of polythioacetals of high molecular weight, which comprises the step of polymerizing symmetrical trithiane by the mass polymerization process in admixture with 0.0001 to 1 mol percent, calculated upon the trithiane, of at least one Lewis acid in an ionic form at a temperature within the range of 220° C. to 250° C.

7. A process for the manufacture of polythioacetals of high molecular weight, which comprises the step of polymerizing symmetrical trithiane by the mass polymerization process in admixture with 0.0001 to 1 mol percent, calculated upon the trithiane, of at least one oxonium salt of a Lewis acid at a temperature within the range of 220° C. to 250° C.

8. A process for the manufacture of polythioacetals of high molecular weight, which comprises the step of polymerizing symmetrical trithiane by the mass polymerization process in admixture with 0.0001 to 1 mol percent, calculated upon the trithiane, of at least one diazonium salt of a Lewis acid at a temperature within the range of 220° C. to 250° C.

9. A process for the manufacture of polythioacetals of high molecular weight, which comprises the step of polymerizing symmetrical trithiane by the mass polymerization process in admixture with 0.0001 to 1 mol percent, calculated upon the trithiane, of at least one aryl-diazonium salt of a Lewis acid at a temperature within the range of 220° C. to 250° C.

References Cited by the Examiner

Fromm et al.: 57B 371–3 (1924) (reported in 18 C.A. 1983).

Reid: Organic Chemistry of Bivalent Sulfur, vol. III (pp. 150–152), 1940.

LEON J. BERCOVITZ, *Primary Examiner.*

M. LIEBERMAN, *Examiner.*